United States Patent [19]

Tsuchiya

[11] 4,037,038

[45] July 19, 1977

[54] RESINS FOR USE AS COATING MATERIAL AND PROCESS FOR PREPARING SAME

[75] Inventor: Shozo Tsuchiya, Kawasaki, Japan

[73] Assignee: Nippon Oil Co., Ltd., Tokyo, Japan

[21] Appl. No.: 711,047

[22] Filed: Aug. 2, 1976

[30] Foreign Application Priority Data

Aug. 5, 1975    Japan .................................. 50-94693

[51] Int. Cl.$^2$ ............................................ C08F 236/22
[52] U.S. Cl. ........................................ 526/56; 526/273;
526/281; 526/283; 526/308; 260/879
[58] Field of Search ................... 526/283, 308, 281, 56;
260/879, 885

[56] References Cited

U.S. PATENT DOCUMENTS

| 2,454,743 | 11/1948 | Mowry | 526/283 |
| 2,462,400 | 2/1949 | Hoover | 526/283 |
| 2,559,790 | 7/1951 | Peters | 526/308 |
| 2,689,240 | 9/1954 | Gerhart | 526/283 |

*Primary Examiner*—Paul R. Michl
*Attorney, Agent, or Firm*—Frank J. Jordan

[57] ABSTRACT

Resins suitable for use as a coating material, consisting essentially of a reaction product of (1) a copolymer of a cyclopentadiene type compound such as dicyclopentadiene and an $\alpha,\beta$-unsaturated monomer such as a hydroxyalkyl acrylate and (2) acrylic acid and/or methacrylic acid; and a process for preparing said resins.

9 Claims, No Drawings

RESINS FOR USE AS COATING MATERIAL AND PROCESS FOR PREPARING SAME

This invention relates to a novel resin suitable for use as a coating material, particularly as a vehicle for printing inks. It relates also to a process for preparing the novel resin.

With the recent progress of printing techniques it has been required that printing speed be increased. Accordingly, printings which may be dried or cured rapidly have been sought increasingly eagerly. In the practice of conventional high-speed printing with a printing ink, a direct-fire or hot-air drying or curing method has been employed as a means for the acceleration of the drying or curing of the printing ink used for the printing. Conventional printing inks used in such heat-set printing are such that they are dried by heating to distil off a solvent contained in amounts of 30–40 wt.% therein. In printing shops, therefore, the vapor of a part of such solvent is discharged thereby raising a problem of environmental pollution in many cases. Thus, printing inks which are free of volatile matter and capable of drying rapidly, are sought by those in the art.

As printing inks which can dry without being accompanied with the evaporation of a solvent from the inks, there have already been known several inks such as ultraviolet rays-curable type inks and heat-curable solvent-free type inks. More particularly, the known printing inks include heat-curable inks in which aminoplasts are combined with an ester (British Pat. No. 123444), and ultraviolet rays-curable inks (Japanese Patent Gazette 10606/57) containing an acryl-modified epoxy resin (Japanese Patent Laying-Open Gazette No. 15202/72) and tung oil which are reactive due to their double bonds. However, none of the conventional solvent-free printing inks are satisfactory because of their insufficiently high curing rate or speed.

The present inventors had made intensive studies in attempts to find resins suitable for use in solvent-free printing inks further improved in curing rate and, as a result of their studies, they have found such resins thereby accomplishing this invention.

The primary object of this invention is to provide novel resins suitable for use as a coating or a vehicle for printing inks.

This object is attained by copolymerizing dicyclopentadiene or the like with at least one $\alpha,\beta$-unsaturated monomer selected from the group consisting of hydroxyalkyl acrylate, hydroxyalkyl methacrylate, glycidyl acrylate, glycidyl methacrylate, allyl glycidyl ether and metallyl glycidyl ether, to produce a copolymer which is then reacted with at least one member selected from the group consisting of acrylic acid and methacrylic acid thereby to obtain a novel resin.

This invention will be further detailed hereinbelow.

The starting copolymers which may be used in this invention include those which are prepared by copolymerizing at least one $\alpha,\beta$-unsaturated monomer with at least one member selected from the group consisting of cyclopentadiene, dicyclopentadiene, tricyclopentadiene, tetracyclopentadiene and their substitution products containing at least one lower alkyl group having 1–3 carbon atoms (the substitution products being methyldicyclopentadiene for example). In this specification the compound to be copolymerized with the $\alpha,\beta$-unsaturated monomer are hereinafter sometimes referred to as a "cyclopentadiene type compound" for brevity.

The copolymer resins of the cyclopentadiene type compound (component A) and the $\alpha,\beta$-unsaturated monomer (component B) are obtained by reacting the component A with the component B at 150°–350° C in the presence or absence of a radical polymerization catalyst and, if desired, in a suitable solvent. The molar ratio of the component A to component B used for the reaction may be in the range of 30/70–95/5 but it may preferably be in the range of 40/60–80/20 for the purpose contemplated by this invention. The copolymer resins are normally solid ones and they can be produced with a desired softening point by varying reaction conditions such as reaction temperature and time depending on the purpose for which they are used. The softening point is usually varied from 50° to 200° C. It is not necessarily required in the production of the novel resin that the cyclopentadiene type compound by a good purity. There may be used dicyclopentadiene of about 85% purity which is obtained for example by heating a $C_5$ fraction produced as by-products by the thermal cracking of naphtha or the like to dimerize cyclopentadiene and methylcyclopentadiene contained in the $C_5$ fraction and then distilling the thus treated fraction to remove therefrom the greater part of the remaining $C_5$ fraction such as $C_5$ olefins and $C_5$ paraffins thereby obtaining dicyclopentadiene of about 85% purity. In addition, the hydroxyalkyl group of the hydroxyalkyl acrylate and hydroxyalkyl methacrylate which may be used as the component B, is 2-hydroxyethyl or 2-hydroxylpropyl.

The starting copolymer resins so obtained are then reacted with acrylic or methacrylic acid in the presence or absence of a suitable catalyst under usual esterifying conditions which are per se known, thereby to esterify the hydroxyl or epoxy groups of the copolymer resin with the carboxyl group of the acrylic or methacrylic acid thus obtaining an esterified resin of this invention suitable as a coating material.

This esterification may be achieved by reacting the starting resin with acrylic or methacrylic acid in amounts of 0.5 to 1 mol of the acid per mol equivalent of the hydroxyl or epoxy groups of the resin; however, it is preferable to use acrylic or methacrylic acid in sufficient amounts to effect the esterification substantially perfectly. The use of the acid in amounts of 0.5 mol in the aforesaid case will result in the production of an esterified resin curable at a low rate or speed, this being undesirable.

In the esterification other reactants such as higher fatty acids or rosin may further be used to enhance the resulting esterified resin in oleophilic property as requid if said resulting resin is to be used as a vehicle for offset printing inks.

Since the esterified resins of this invention for use as a coating material is easily curable under the action of heat or radiation such as ultraviolet rays or electronic beams, they are very suitable to use as a vehicle for coating materials such as paints or printing inks. The esterified resins have a softening point in the range of usually 30°–150° C; if they are ones which have a lower softening point within said range and can therefore be easily melted for fluidization by heating then they may be homogeneously mixed only with a pigment without the use of a solvent to prepare a paint or ink, while if they are ones which have a higher softening point then they may be incorporated with a pigment after the dissolution thereof in a suitable solvent thereby preparing a paint or ink. The solvents used herein may include various known solvents; however, they may preferably include the following reactive solvents to effect a rapid and easy cure of the esterified resins of this invention. The reactive solvents may be at least one kind of ethylemically unsaturated (reactive double bond) and crosslinkable monomer which is capable of crosslinking reaction with the esterified resin under the action of heat or radiation such as ultraviolet rays or electronic beams. Typical of the reactive solvents are crosslinkable monomers having an acryl or methacryl residue, such as pentaerythritol tetra(meth)acrylate, pentaerythritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol di(meth)acrylate, 2-hydroxyethyl meth(acrylate), 2-hydroxypropyl (meth)acrylate, alkyl (meth)acrylates wherein the alkyl is a $C_1$–$C_{18}$ one, and glycidyl (meth)acrylate (the aforesaid expression "(meth)acrylate" being intended to mean "acrylate or methacrylate").

Coating compositions prepared by dissolving the esterified resin of this invention in the reactive solvent may, as their excellent property, be cured very rapidly due to their crosslinking reaction under the action of heat or radiation and, therefore, it is very preferable to use them as a vehicle for paints or printing inks. In this curing the reactive solvent used is combined in the resulting coating as a part thereof by a crosslinking reaction between the esterfied resin and the reactive solvent without being discharged by evaporation as usual solvents, thus raising no problem of environmental pollution due to the discharge of solvent vapor.

When the coating compositions are used as a vehicle for paints or printing inks they may be incorporated with a cure accelerator to accelerate the cure thereof, this being preferable in many cases. In that the coating compositions are cured by heating, an organic peroxide may be used singly or jointly with a decomposition accelerator as the cure accelerator and a certain ketonic resin may also be used as the cure accelerator under heat. In case that the coating compositions are cured under the radiation of ultraviolet rays, sensitizers such as various benzoin ethers, benzophenone and Michler's ketone may be used as the cure accelerator. The starting copolymer according to this invention may preferably consist of the polymerization units derived from the cyclopentadiene type compound and the polymerization units derived from the α,β-unsaturated monomer, in molar ratios of from about 30 : 70 to about 95 : 5.

The esterified copolymer of this invention may preferably consist of the units derived from the starting copolymer and the units derived from at least one of acrylic and methacrylic acids, in amounts of 0.5–1 mol of the acid per mol equivalent of the carboxyl or epoxy group of the coplymer.

This invention will be better understood by the following Examples wherein all percentages and parts are by weight unless otherwise specified.

EXAMPLE 1

To a 500-ml autoclave with a stirrer were added 132 g of dicyclopentadiene of 97% purity, 58 g of 2-hydroxyethyl acrylate and 110 g of commercially available mixed xylene to form a mixture which was reacted at 260° C for 5 hours. After the end of the reaction, the autoclave was cooled and the reaction mixture therein distilled to remove therefrom the unreacted monomer, lower polymers and xylene thereby to obtain 180 g of a resin [I] having a softening point of 70.0° C.

Then, 100 g of the resin [I], 37.5 g of acrylic acid, 0.15 g of hydroquinone, 1.5 g of p-toluene-sulfonic acid and 100 g of benzene were charged into a three-necked flask to form a mixture which was reacted at 100° C for 15 hours thereby to obtain a resin [I-E]. One hundred grams of the resin [I-E] was incorporated with 20 g of trimethylolpropane triacrylate (TMPTA) thereby to obtain a varnish[I-E-V]. By using the thus obtained varnish[I-E-V]two kinds of inks A and B were prepared in accordance with the following formulations.

| Ink A (Curable by the radiation of ultraviolet rays) | |
|---|---|
| Lionel blue-SM (Trademark) (Phthalocyanine pigment produced by Toyo Ink Mfg. Co., Ltd.) | 18 Parts |
| Varnish [I - E - V] | 70 Parts |
| Vaseline | 3 Parts |
| TMPTA | 6 Parts |
| Benzoin methyl ether | 6 Parts |
| Total | 100 Parts |
| Inkometer value | 7.5/400 rpm 30° C |
| Spreadmeter value | 20.0/25° C |
| | |
| Ink B (Curable by heat) | |
| Carmine 6B (T) (Monoazo pigment produced by Toyo Ink Mfg. Co., Ltd.) | 16 Parts |
| Varnish [I - E - V] | 63 Parts |
| Wax compound* | 5 Parts |
| Magie oil No. 470 | 6 Parts |
| Cyclonox** (Trademark) (Peroxide produced by Kayaku Nooley) | 5 Parts |
| Co drier (Co : 4%) | 5 Parts |
| Total | 100 Parts |
| Ink-0.'meter value | 7.0/400 rpm 30° C |
| Spreadmeter value | 19.0/25° C |

*A dispersion of 27 parts of micricrystalline wax in 73 parts of Magie oil
**Peroxide is blended with the other materials soon before the resulting ink is used. This applies to the following Examples.

The ink A so obtained was printed on art paper (or slick paper) in the amount of 25 mg/100 cm² by the use of a RI tester (produced by Akira Works) and the printed paper was passed 10 cm below a high pressure ultraviolet lamp (Trademark : Toshiba H 2000 L) at a velocity of 10 m/min. whereby the ink so printed was cured perfectly.

EXAMPLE 2

An autoclave was charged with 132 g of DCPD (dicyclopentadiene) of 97% purity, 142 g of glycidyl methacrylate and 120 g of toluene. The resulting mixture in the autoclave was reacted at 260° C for 3 hours. After the completion of the reaction the reaction mixture was treated in the same manner as in Example 1 thereby to obtain 190 g of a resin [II ] having a softening point of 70° C and an oxilane type oxygen content of 5.5 wt.%.

To a flask were then added 100g of the resin [II ], 32g of methacrylic acid, 0.1g of hydroquinone, 1.5g of p-toluenesulfonic acid and 40g of benzene to form a mixture which was reacted under reflux of the benzene for 15 hours while blowing air into the flask, thereby obtaining a resin [II - E ]. One hundred grams of the resin [II - E ] were dissolved in 30g of diethylene glycol diacrylate (DEGDA) to obtain a varnish [II - E - V]. By using the varnish [II - E - V] as a vehicle, an ink C was prepared in accordance with the formation of the ink A of Example 1.

The ink C so prepared was printed and then radiated by ultraviolet rays while moving at a velocity of 12m/min. under the same conditions as in Example 1 whereby the ink so printed was cured completely.

EXAMPLE 3

A $C_5$ cracked oil fraction (boiling in the range of 28°–60° C) obtained as by-products when producing ethylene, propylene and the like by steam crackling naphtha, was heated at 120° C for 4 hours to remove a $C_5$ fraction thus recovering the remaining fraction containing 85% of DCPD together with cyclopentadiene, codimer of isoprene and piperylene and the like. An autoclave was charged with 160g of said remaining fraction, 120g of allyl glycidyl ether and 90g of benzene to form a mixture which was reacted at 260° C for 4 hours. After the end of the reaction, the reaction mixture was treated in the same manner as in Example 1 thereby to obtain 170g of a resin [III] having a softening point of 67° C and an oxilane type oxygen content of 5.7 wt.%.

A flask was charged with 100g of the resin [III], 28g of acrylic acid, 0.1g of hydroquinone, 1.5g of p-toluenesulfonic acid and 50g of benzene to form a mixture which was then reacted under reflux of the benzene for 12 hours while blowing air into the flask, thereby to obtain a resin [III - E]. One hundred grams of the resin [III - E] were dissolved in 25g of TMPTA thereby obtaining a varnish [III - E - V]. By using the varnish as a vehicle, an ink D was prepared in accordance with the formulation of the ink A of Example 1.

In the same manner as in Example, the ink D was printed and then radiated by ultraviolet rays while moving the printed material at a velocity of 10 m/min. whereby the ink so printed was cured perfectly.

What is claimed is:

1. Resins suitable for use as a coating material, consisting essentially of an esterified copolymer of (1) a copolymer of (i) at least one cyclopentadiene compound selected from the group consisting of cyclopentadiene, dicyclopentadiene, tricyclopentadiene, tetracyclopentadiene and lower alkyl substitution products thereof wherein the lower alkyl has 1–3 carbon atoms and (ii) at least one α, β-unsaturated monomer selected from the group consisting of hydroxyalkyl acrylate, hydroxyalkyl methacrylate, glycidyl acrylate, glycidyl methacrylate, allyl glycidyl ether and methallyl glycidyl ether and (2) at least one of acrylic and methacrylic acids.

2. Resins according to claim 1, wherein the copolymer (1) has a softening point of 50°–200° C and the esterified copolymer has a softening point of 30°–150° C.

3. Resins according to claim 1, wherein the hydroxyalkyl of the hydroxyalkyl acrylate and methacrylate is 2-hydroxyethyl or 2-hydroxypropyl.

4. Resins suitable for use as a coating material, consisting essentially of (A) an esterified copolymer of (1) a copolymer of (i) at least one cyclopentadiene compound selected from the group consisting of cyclopentadiene, dicyclopentadiene, tricyclopentadiene, tetracyclopentadiene and lower alkyl substitution products thereof wherein the lower alkyl has 1–3 carbon atoms and (ii) at least one α,β-unsaturated monomer selected from the group consisting of hydroxyalkyl acrylate, hydroxyalkyl methacrylate, glycidyl acrylate, glycidyl methacrylate, allyl glycidyl ether and methallyl glycidyl ether and (2) at least one of acrylic and methacrylic acids and (B) at least one reactive solvent.

5. Resins according to claim 4, wherein the reactive solvent is a member selected from the group consisting of pentaerithritol tetra(meth)acrylate, pentaerithritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol di(meth)acrylate, 1,2-hydroxyethyl (meth)acrylate, 2-hydroxypropyl (meth)acrylate, an alkyl (meth)acrylate in which the alkyl is a $C_1$–$C_{18}$ one, and glycidyl (meth)acrylate.

6. Resins according to claim 5, wherein the hydroxyalkyl of the hydroxyalkyl acrylate and methacrylate is 2-hydroxyl or 2-hydroxypropyl.

7. A process for preparing a resin suitable for use as a coating material, comprising the steps of:
   reacting a cyclopentadiene compound selected from the group consisting of cyclopentadiene, dicyclopentadiene, tricyclopentadiene, tetracyclopentadiene and lower alkyl substitution products thereof wherein the lower alkyl has 1–3 carbon atoms with an α,β-unsaturated monomer selected from the group consisting of hydroxyalkyl acrylate, hydroxyalkyl methacrylate, glycidyl acrylate, glycidyl methacrylate, allyl glycidyl ether and methallyl glycidyl ether in molar ratios of from 30 : 70 to 95 : 5 at 150°–350° C in the presence or absence of a known radical catalyst and/or a solvent for a time sufficient to produce a copolymer having a softening point of 50°–200° C, and
   esterifying the thus produced copolymer resin with at least one of acrylic acid and methacrylic acid in amount of at least 0.5–1 mol of the acid per mol equivalent of the carboxyl or epoxy group of the copolymer in the presence or absence of a known esterifying catalyst thereby to prepare an esterified copolymer having a softening point of 30°–150° C for use as the resinous coating material.

8. A process according to claim 7, wherein the hydroxyalkyl of the hydroxyalkyl acrylate and methacrylate is 2-hydroxyethyl or hydroxypropyl.

9. A process according to claim 7, wherein the esterifying reaction is effected in the presence of at least one additional reactant selected from the group consisting of higher fatty acids and rosin.

* * * * *